United States Patent [19]

Triplett

[11] Patent Number: 4,487,845

[45] Date of Patent: Dec. 11, 1984

[54] METHOD OF ENHANCING STEREOSPECIFICITY OF A CATALYST SYSTEM

[75] Inventor: Kelly B. Triplett, Stamford, Conn.

[73] Assignee: Stauffer Chemical Company, Westport, Conn.

[21] Appl. No.: 148,336

[22] Filed: May 9, 1980

[51] Int. Cl.$^3$ ................................................. C08F 4/64
[52] U.S. Cl. .................................... 502/107; 502/113; 502/118; 502/121; 502/122; 502/123; 502/124; 502/125; 502/126; 502/127; 502/129; 502/134; 526/114; 526/125
[58] Field of Search ..................................... 252/429 B

[56] References Cited

U.S. PATENT DOCUMENTS

| | | | |
|---|---|---|---|
| 3,758,621 | 9/1973 | Morikawa et al. | 252/429 B X |
| 3,784,481 | 1/1974 | Lassau et al. | 252/429 B X |
| 4,107,414 | 8/1978 | Giannini et al. | 252/429 C X |
| 4,156,063 | 5/1979 | Giannini et al. | 252/429 B X |
| 4,215,013 | 7/1980 | Loontjens | 252/429 B |

*Primary Examiner*—Patrick Garvin
*Attorney, Agent, or Firm*—Henry Z. Friedlander

[57] ABSTRACT

A novel catalyst system for the polymerization of alpha-olefins is provided. The catalyst system is produced by a process comprising heating to an effective temperature for an effective length of time:
(i) an organoaluminum containing component comprising an organoaluminum compound and an electron donor compound, e.g. triethyl aluminum and ethyl anisate, and
(ii) a titanium halide containing component obtained by contacting a titanium halide compound, e.g. TiCl$_4$, or complex of the titanium halide compound and an electron donor compound, e.g. TiCl$_4$.ethylbenzoate, with a support which comprises as the essential support material thereof an anhydrous bihalide of magnesium or manganese in an active state.

The combination of effective temperature and effective time is selected to be sufficient to produce a catalyst system having enhanced stereospecificity.

A process for producing the catalyst system, a process for the polymerization of alpha-olefins are provided as well as a method of enhancing the stereospecificity of catalyst systems used for the polymerization of alpha-olefins.

39 Claims, No Drawings

METHOD OF ENHANCING STEREOSPECIFICITY OF A CATALYST SYSTEM

BACKGROUND OF THE INVENTION

1. Field of the Invention

This invention relates to a novel catalyst system for the polymerization of alpha-olefins, process for producing this catalyst system, process for the stereoregular polymerization of alpha-olefins using such catalyst system, and a method of enhancing the stereospecificity of a catalyst system.

2. Prior Art

The polymerization of alpha-olefins in the presence of a catalyst system comprising (i) an organoaluminum containing component, and (ii) a titanium halide containing component is well known in the art and the polymers produced utilizing such catalyst systems have found numerous uses. The resulting crystalline polymers have associated therewith, to a greater or lesser degree, a low molecular weight amorphous polymer, which ranges from a viscous liquid to a soft tacky solid and is soluble in hydrocarbons, e.g. heptane. The production of a polymer having a low concentration of such amorphous polymer results in the polymer having highly desirable properties, such as hardness, density, tensile strength, melting temperature and molding and fiber forming properties. Thus, the production of highly stereoregular crystalline polymers having a low concentration of amorphous polymer is a desirable objective for a catalyst system and polymerization process.

It is also desirable that high amounts of polymer be produced per unit of time per unit of catalyst employed, i.e. the catalyst system should have a high activity. It is thus important that when seeking to improve the stereospecificity of a catalyst system, that the activity not be substantially decreased. Ideally, it is highly desirable to improve simultaneously the stereospecificity and activity of a catalyst system.

Various approaches to achieving the aforementioned objectives have been proposed in the art.

It is known in the art, for example, that activity and/or stereospecificity of a catalyst system containing an aluminum reduced titanium trichloride material may be enhanced by grinding the material.

It is also known that the activity and/or stereospecificity of Ziegler type catalysts can be modified by adding to the catalysts certain auxiliary components. For example, U.S. Pat. Nos. 3,701,763 and 3,850,899 to Wada et al. teach that stereoregular polymers can be provided if the titanium trichloride component is pulverized in the presence of auxiliary components, including certain aliphatic and aromatic ethers, amines and ketones. Such catalyst systems, generally still have a comparatively low activity and the polymer produced requires de-ashing.

Generally, these auxiliary components, e.g. electron donors, are used in the form of complexes, with the titanium compound, however, catalyst systems are known in which the electron donor can be used in combination with the organoaluminum compound in an amount as high as a 1:1 molar ratio of organoaluminum compound to electron donor.

Additionally, attempts to increase the activity of a catalyst system have been made by supporting the titanium halide compound on, for example, magnesium chloride.

When the polymerization of propylene is carried out with supported catalysts wherein the titanium compound is used in the form of a complex with an electron donor (such as a Lewis base) the stereospecificity of the catalyst is increased, but the amount of the amorphous polymer is still too high.

Attempts have also been made to improve the stereospecificity and/or activity of such catalyst systems by varying the amount of titanium compound to total electron donor compound present in the catalyst system, see for example, U.S. Pat. No. 4,107,414 to Giannini et al. These catalyst systems are still not completely satisfactory.

SUMMARY OF THE INVENTION

In accordance with this invention there is provided a novel catalyst system for the polymerization of alpha-olefins. The catalyst system is produced by a process comprising heating to an effective temperature for an effective length of time:

(i) an organoaluminum containing component comprising an organoaluminum compound and an electron donor compound; and (ii) a titanium halide containing component obtained by contacting a titanium halide compound or complex of the titanium halide compound and an electron donor compound, with a support which comprises as the essential support material thereof an anhydrous bihalide of magnesium or manganese in an active state.

The combination of effective temperature and effective time is selected to be sufficient to produce a catalyst system having enhanced stereospecificity.

In accordance with other aspects of this invention, a process for producing such catalyst system and a process polymerization of alpha-olefins using the aforesaid catalyst system are provided.

In accordance with still another aspect of this invention, a method is provided for enhancing the stereospecificity of a catalyst system for the polymerization of alpha-olefins. The system which can utilize such a method comprises:

(i) an organoaluminum containing component comprising an organoaluminum compound and an electron donor compound; and (ii) a titanium halide containing component obtained by contacting a titanium halide compound or complex of the titanium halide compound and an electron donor compound, with a support which comprises as the essential support material thereof an anhydrous bihalide of magnesium or manganese in an active state.

The method comprises prior to contacting the catalyst system with the alpha-olefin, heating the organoaluminum containing component for an effective length of time, the combination of effective temperature and effective time being sufficient to produce a catalyst system having enhanced stereospecificity.

DETAILED DESCRIPTION OF THE INVENTION

The invention described herein is broadly applicable to the polymerization of olefins corresponding to the formula R—CH=CH$_2$, wherein R is an alkyl radical containing from 1 to 8, inclusive, carbon atoms. The preferred olefins include propylene, 1-butene, 1-pentene, 4-methyl-1-pentene and the like. The term "polymer" as used herein includes both homopolymers and copolymers, and the polymerization of mixtures of alpha-olefins with minor proportions of ethylene. For the purposes of simplification, the invention is described herein with particular reference to the production of propylene, however, the invention is not to be so limited.

The organoaluminum containing component comprises the conventional organoaluminum compound (used in the polymerization of alpha-olefins using conventional reaction conditions for such a polymerization) and an electron donor compound. Organoaluminum compounds which are particularly suitable are: alkyl-haloaluminum compounds having the formula $AlR_nX_{3-n}$, where R represents $C_{1-14}$ a saturated hydrocarbon residue; X represents a halogen, particularly Cl and Br, and n is 2 or 1.5; and alkyl aluminum compounds having the formula $AlR_n(OR')_{3-n}$ where R and n are defined above and R' represents a $C_{1-14}$ saturated hydrocarbon residue that can be the same as R. Trialkyl aluminums having the formula $AlRR'R''$, where R, R' and R'' are the same or different and respectively, represent a $C_{1-14}$ saturated hydrocarbon residue are a particularly preferred group for use.

The following are examples of suitable organoaluminum compounds: trimethyl aluminum, triethyl aluminum, tripropyl aluminum, tributyl aluminum, triisobutyl aluminum, trioctyl aluminum, tridodecyl aluminum, methyl aluminum sesquichloride, ethyl aluminum sesquichloride, diethyl aluminum chloride, ethyl aluminum dichloride, dibutyl aluminum chloride, diethyl aluminum sesquibromide, and mixtures thereof. Triethyl aluminum is a particularly preferred organoaluminum compound for use in this invention for the polymerization of propylene.

The organoaluminum compounds may also, for example, contain two or more aluminum atoms linked together through an oxygen or a nitrogen atom. These organoaluminum compounds are obtained by the reaction of a trialkyl aluminum compound with water, ammonia or a primary amine, according to known methods. Typical examples of such compounds are:

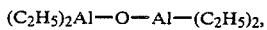

$(C_2H_5)_2Al-O-Al-(C_2H_5)_2$,

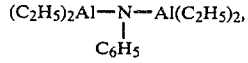

$$(C_2H_5)_2Al-N-Al(C_2H_5)_2,$$
$$\quad\quad\quad\quad\,\,|$$
$$\quad\quad\quad\,\,C_6H_5$$

Suitable electron donor compounds are amines, amides, ethers, esters, ketones, nitriles, phosphines, stibines, arsines, phosphoramides, thioethers, aldehydes, alcoholates, and the organic acid salts of metals belonging to the first four Groups of the Periodic Table of the Elements. The best results, as regards both activity and stereospecificity, are achieved when esters of carboxylic acids or diamines, particularly esters of aromatic acids, are used as the electron donors.

Examples of esters and diamines which can be used are: esters of aliphatic, cycloaliphatic and aromatic mono and polycarboxylic acids; esters of alkoxy or amino acids; esters of inorganic acids like carbonic, phosphorous, sulphuric, phosphoric and silicic acids. Examples of specific compounds are: ethyl benzoate, methyl benzoate, methyl and ethyl p-methoxybenzoate, ethyl butylbenzoate, ethyl p- and o-chlorobenzoate, ethyl butoxybenzoate, isobutyl benzoate, ethyl methylbenzoate, ethyl acetate, ethyl propionate, ethyl alpha-naphtyl ether, ethyl cyclohexyl, ether, ethyl pivalate, ethyl N,N-diethylcarbamate, diethyl carbonate, diethyl sulfate, dimethyl maleate, ethyl benzenesulfonate, triethyl borate, ethyl beta-naphthyl ether, ethyl tolyl ether, N,N,N',N'-tetramethylenediamine, 1,2,4-trimethylpiperazine, 2,5-dimethylpiperazine, and the like.

The most interesting results, both with respect to activity and stereospecificty of the catalyst system, are obtained with the esters of the aromatic acids like: ethyl benzoate and ethyl methoxybenzoate (i.e. ethyl anisate).

The organoaluminum compound/electron donor molar ratio is generally lower than 10:1 and, in the case of ester electron donors, range from 10:1 to 2:1, and more particularly from 6:1 to 2:1. Generally, the activity and stereospecificity of the catalyst system are affected in opposite ways by the molar ratio, in the sense that the higher the molar ratio the higher the activity and the lower the stereospecificity.

By heating (i) the organoaluminum containing component and (ii) the titanium containing component as described herein, a significant enhancement of the stereospecificity of the catalyst system results.

It has been found that, depending upon the particular organoaluminum containing component, i.e. the organoaluminum compound and electron donor compound, as well as titanium halide containing component, a critical molar ratio of the organoaluminum compound and electron donor may exist wherein at high molar ratios of organoaluminum compound to electron donor compound the heating step of this invention does not appreciably enhance the stereospecificity of the catalyst system. This molar ratio and its existence can readily be determined by those skilled in the art. It is theorized that this lack of enhancement of stereospecificity is caused by the lack of an effective amount of the combined product of the organoaluminum compound and the electron donor.

The titanium halide containing component contains a halogenated compound of either bivalent, trivalent or tetravalent titanium. Preferred titanium halides are a titanium trichloride material (described below) and titanium tetrachloride.

The titanium trichloride material which may be used in or as the component can be produced in a variety of ways including:
 (a) reduction of titanium tetrachloride with a metal such as aluminum or titanium, the reduced titanium material being either milled or unmilled;
 (b) reduction of titanium tetrachloride with hydrogen;
 (c) reduction of titanium tetrachloride with an organometallic compound such as an aluminum alkyl; or
 (d) grinding a combination of titanium trichloride and a halide of a Group III metal, such as an aluminum halide.

Examples of suitable titanium trichloride materials are well known in the art and are described in a number of publications and patents, including U.S. Pat. Nos. 3,639,375 to Staiger et al. and 3,701,763 to Wada et al. which are each incorporated herein by reference as showing the type of titanium trichloride material which may be used in the present invention.

Examples of specific titanium halide compounds which may be contained in the component are $TiCl_4$, $TiI_4$, $Ti(OC_3H_7)Cl_3$, $Ti(OC_4H_9)_2Cl_2$, $3TiCl_3 \cdot AlCl_3$, $Ti[O-C(CH_3)=CH-CO-CH_3]_2Cl_2$, $Ti[N(C_2H_5)_2]Cl_3$, $Ti[N(C_6H_5)_2]Cl_3$, $Ti(C_6H_5COO)Cl_3$, $[N(C_4H_9)_4]_2TiCl_6$, $[N(CH_3)_4]Ti_2Cl_9$, $TiBr_4$, $TiCl_3OSO_2C_6H_5$, and $LiTi(OC_3H_7)_2Cl_3$.

Preferably, the titanium halide compound, e.g. the titanium trichloride material or titanium tetrachloride, is combined with an effective amount of electron donor compound to improve the stereospecificity or stereospecificity and activity of the catalyst system. Examples of suitable electron donor compounds which can be used in the present invention can be selected from those described in U.S. Pat. Nos. 3,639,375 to Staiger et al. and 3,701,763 to Wada et al. and those previously described for use in the organoaluminum containing component. The following classes of electron donor compounds may be used:

Organic oxygen-containing compounds such as the aliphatic ethers, aromatic ethers, aliphatic carboxylic acid esters, cyclic esters of carbonic acid, aromatic carboxylic acid esters, unsaturated carboxylic acid esters, aliphatic alcohols, phenols, aliphatic carboxylic acids, aromatic carboxylic acids, aliphatic carboxylic acid halides, lactones, aromatic carboxylic acid halides, aliphatic ketones, aromatic ketones, and monoterpenic ketones.

Organic nitrogen-containing compounds such as the aliphatic amines, aromatic amines, heterocyclic amines, aliphatic nitriles, aliphatic carbamates, aromatic nitriles, aromatic isocyanates and aromatic azo compounds;

Mixed oxygen-nitrogen compounds such as the aliphatic and aromatic amides, guanidine, and its alkyl substituted derivatives;

Organic phosphorus-containing compounds such as the aliphatic phosphines and aromatic phosphines;

Mixed phosphorus-nitrogen compounds such as the phosphoric amides;

Sulfur-containing compounds such as carbon disulfide, the aliphatic thioethers, and the aromatic thioethers; and Organic silicon-containing compounds including monomer type compounds such as the tetrahydrocarbylsilanes, organohydrogenosilanes, organohalogenosilanes, organoaminosilanes, organoalkoxysilanes, organoaryloxysilanes, organosilicon isocyanates, and organosilanol carboxylic acid esters; and polymer-type compounds such as the polysilalkylenes, organopolysilanes, organopolysiloxanes, $\gamma,\omega$-dihaloorganopolysiloxanes, organocyclopolysiloxanes and polysilazanes.

Examples of some preferred electron donor compounds are hexamethyl phosphoric triamide, dimethyl formamide, benzonitrile, $\gamma$-butyrolactone, dimethyl acetamide, N-methyl pyrrolidone, N,N-dimethylpivalamide, toluene diisocyanate, dimethyl thioformamide, ethylene carbonate, trilauryl trithiophosphite, tetramethyl guanidine and methyl carbamate. Other widely used and preferred electron donors are: N,N,N',N'-tetramethylenediamine, veratrol, ethyl benzoate, acetone, 2,5-hexanedione, dimethylmaleate, dimethyl malonate, tetrahydrofurfuryl methyl ether, nitrobenzene, diethyl carbonate, acetophenone, 1,2,4-trimethyl piperazine, ethyl acetate. Particularly preferred is ethyl benzoate. Others which can be used in practicing the present invention are known to persons of skill in the art.

The diamines and the esters of oxygenated organic and inorganic acids are particularly suitable both with respect to the activity and stereospecificity of the catalyst.

The titanium halide containing component is a magnesium halide or manganese halide supported component, and most preferably an anhydrous magnesium chloride ($MgCl_2$) supported titanium halide containing component. These type components and catalyst systems are known in the art; see, for example, U.S. Pat. Nos. 4,156,063 to Giannini et al.; 4,146,502 to Yokoyama et al.; 4,130,503 to Fodor; 4,107,415 to Giannini et al.; 4,107,414 to Giannini et al.; 4,107,413 to Giannini et al.; 4,107,412 to Welch; 4,105,847 to Ito et al.; 4,013,823 to Longi et al.; 3,953,414 to Galli et al., and British Pat. No. 1,335,887 to Giannini et al. The entire disclosures of all of these references are incorporated herein by reference.

The support material is an activated anhydrous magnesium or manganese halide. Halides such as magnesium chloride, magnesium bromide and magnesium iodide can be used. Among these, magnesium chloride is preferred. Furthermore, this magnesium halide should be substantially anhydrous so that it will not have a deleterious effect on the catalyst system performance.

In the production of supported titanium halide containing components a mechanical contacting measure such as milling is generally required between the magnesium or manganese halide and the other constituents. In the case where milling is not carried out, it is desirable that the magnesium or manganese halide be milled beforehand. The halide of magnesium or manganese is preferably activated to the extent that in the titanium halide containing component, and/or the magnesium or manganese halide, the X-ray spectrum of at least the most intense diffraction line in the spectrum of the non-activated magnesium or manganese halide is decreased in intensity and in its place there is a broadened (independent of particle size) halo, and/or the titanium halide containing component and/or the magnesium or manganese halide has a surface area greater than about 3 sq. m. per g. For example, in the case of the anhydrous magnesium chloride, some very active forms have in the X-ray spectrum the reflection at $d=2.56$ Å (which is the most intense of the spectrum of normal non-activated magnesium chloride) which is of lower intensity and a broadened halo than in the non-activated form. Similarly, for some active forms of manganese chloride, the reflection intensity at $d=2.57$ Å (the most intense in the spectrum of normal non-activated manganese chloride) is of lower intensity and a broadened halo than in the non-activated form.

The most active forms of magnesium chloride or manganese chloride have a surface area greater than 15 sq. m. per g.

The activated magnesium or manganese halide may be prepared before or during contact with the titanium halide compound. One of the most suitable methods comprises dissolving the magnesium or manganese halide in an alcohol, ether, ester or other anhydrous organic solvent, removing the bulk of the solvent by a rapid evaporation, and then completing the removal of the solvent at reduced pressure and at temperatures above 100° C., preferably from 150° to 400° C. Activated forms may also be obtained by very fine grinding or by other physical methods in which the carrier particles are subjected to frictional and/or shearing forces, for example, subjecting the anhydrous magnesium or manganese halide to intensive grinding, until it has a surface area higher than 3 m²/g.

Preferably, however, the titanium halide is co-ground with the magnesium or manganese halide under such conditions as to obtain a surface area higher than about 3 m²/g.

For general guidance, the quantity of titanium present on a supported titanium halide containing component is between about 0.1 and 10% by weight, expressed as titanium metal. Again, for general guidance, the quantity of titanium present in the catalyst system, expressed as titanium metal, may be less than 0.3 grams-atoms per mole of the total amount of electron donor compound present in the catalyst system, preferably this quantity is less than about 0.1 gram-atom and more particularly, it is between about 0.05 and about 0.005 gram atoms. The Al/Ti molar ratio is generally less than 1,000 and most preferably less than 500 and most preferably from 100 to about 500.

The process for preparing the catalyst system of this invention comprises, prior to contacting with the alpha-olefin, heating the organoaluminum containing component and the titanium halide containing component to an effective temperature for an effective length of time. The combination of effective temperature and effective time is selected so as to be sufficient to produce a catalyst system having enhanced stereospecificity. The heating step may be performed in the polymerization reactor just prior to the introduction of the alpha-olefin. The heating step may also be performed in a completely separate vessel and the catalyst system then transferred to the polymerization reactor just prior to the introduction of the alpha-olefins into the reactor.

It has been found that the effective temperature and effective length of time for heating is highly dependent on the type catalyst system used, and most particularly, on the composition of the organoaluminum containing component. For general guidance, however, a heating time of between about 5 minutes and about 90 minutes at temperatures between about 40° C. and about 80° C. should be adequate to produce the novel catalyst system of this invention having enhanced stereospecificity over catalyst systems which have not been so heated. Preferably, a time range of from 15 minutes to 45 minutes and a temperature range of 40° C. to 65° C. is used.

The conditions under which the polymerization of alpha olefins with the aid of the catalyst system of this invention is conducted are those known in the art. The polymerization is carried out at temperatures ranging from −80° C. to 150° C., preferably from 40° C. to 100° C., operating with partial pressures of the alpha olefins higher than atmospheric pressure. The polymerization can be carried out both in liquid phase in the presence, or in the absence of an inert diluent, or in the gas phase. The alpha-olefins comprise in general olefins $CH_2=CHR$ in which R is an alkyl radical containing 1 to 8 carbon atoms. Propylene, 1-butene, 1-pentene, 4-methyl-1-pentene are examples of alpha-olefins. As herebefore indicated, the process can be used to polymerize mixtures of alpha-olefins with minor properties of ethylene.

Examples of inert diluents which may be used in the polymerization are the $C_4$–$C_8$ aliphatic hydrocarbons, examples of which are n-hexane, n-heptane, the cycloaliphatic hydrocarbons like cyclohexane and the aromatic ones such as benzene, toluene, xylene.

The regulation of the molecular weight of the polymer during the polymerization may also be carried out according to known methods, e.g. operating in the presence of alkyl halides, Zn or Cd organometallic compounds, or hydrogen.

It has been found that the catalyst system of this invention has enhanced stereospecificity. Typically, the stereospecificity of the catalyst system, expressed as the Isotactic Index ("II") (explained more in detail in the examples) may be enhanced by as much as 25 percentage points, typically from 10 to 20 percentage points, over the prior art systems. Typically, the Isotactic Index may be raised from, say, 80% to 95%. Such an increase in Isotactic Index reduces the amount of amorphous polymer in the total polymer from 20% to 5%, thus reducing the quantity of amorphous polymer by almost 75%.

The following examples are given to illustrate better the present invention and are not intended to be limiting.

EXAMPLES

General Procedure

The following is a description of the general procedure used for most of the following examples. Exceptions are noted in the specific examples.

CATALYST SYSTEM

A preferred catalyst system which has been found to have a relatively high activity and high stereospecificity is the following catalyst system:

Titanium Halide Containing Component (a) $TiCl_4$.ethyl benzoate—Into a three-neck round-bottom flask was placed 150 grams of ethyl benzoate (1.0 moles) and a quantity of heptane added to fill substantially the flask. An addition funnel was placed on one of the necks, and a small amount of heptane placed therein. 115 ml. of $TiCl_4$ (1.0 mole) was also added to the addition funnel and slowly dripped into the flask. Yellow crystals formed immediately. The mixture was stirred for two hours, filtered, washed in heptane, and vacuum dried overnight.

(b) Magnesium chloride—Commercially available anhydrous magnesium chloride is vacuum-dried at, for example, 180° C. or treated with anhydrous hydrogen chloride at 350° C. and milled for five days (surface area=40–60 m$^2$/g.; $H_2O$=0.09–0.92%).

(c) Preparing component—11 parts by weight of the $TiCl_4$.ethyl benzoate composition was mixed with 39 parts magnesium chloride in a ball mill at room temperature. Within 20 minutes the temperature was about 55° C. and remained constant thereafter. The composition was milled for 24 hours. The final product is the titanium halide containing component used in the catalyst system of this invention. The composition contained about 3.1% titanium.

Organoaluminum Containing Component

Prepared by reacting triethyl aluminum ("TEAL") and ethyl anisate in the polymerization reactor as described below.

HEATING AND POLYMERIZATION PROCEDURE

The following heating and polymerization procedure was utilized.

A one gallon jacketed autoclave, i.e., the polymerization reactor, equipped with a mechanical stirrer was charged with 1 liter of dry heptane at about 45° C. to 55° C.

The catalyst system was then added to the autoclave for heating as follows:

1. A nitrogen purge was passed through the autoclave and adjusted to purge the port during the addition of the catalyst system. A weighed quantity of the organoaluminum compound was added by syringe and stirred for 5 or 10 seconds. A weighed quantity of the required electron donor was then added through the port and the reactor stirred for another 5 to 10 seconds. The solid titanium halide containing catalyst component was then added. The autoclave was then heated to the effective temperature and held at this temperature for the required amount of time, i.e., effective time. Then propylene was injected into the autoclave to a pressure of 10 atmospheres and the temperature maintained at 65° C. During the polymerization, additional propylene was fed as needed to maintain this pressure. The polymerization test was carried out for 1½ hours.

At the end of the polymerization, the polymer mixture was filtered, washed with isopropyl alcohol, and oven dried at 70° C. and weighed to produce Dry Polymer. The polymerization solvent is evaporated to determine heptane soluble polymer. The catalyst activity is defined herein as the ratio:

$$\frac{\text{Weight of Dry Polymer and Weight of Heptane Soluble Polymer}}{\text{Weight of Solid Titanium Halide Containing Catalyst Component}}$$

The Dry Polymer is extracted with heptane for 3 hours in a Soxhlet apparatus. The percent heptane insolubles ("$C_7$") is defined as the percentage of the heptane insoluble fraction in the Dry Polymer.

The Isotactic Index (II), a measure of the insoluble polymer produced, is defined herein as:

$$II = \frac{\text{``}C_7\text{''} \times \text{Wt. of Dry Polymer}}{\text{Wt. of Total Polymer Produced}}$$

The total polymer produced includes the Dry Polymer and the polymer produced which was soluble in the polymerization solvent.

Before the discovery of the present invention, the propylene was added immediately following contact of the catalyst and cocatalyst and brought to polymerization temperature (65° C.) in less than 5 minutes.

SPECIFIC EXAMPLES

The aforedescribed General Procedure was used for performing the following polymerization tests.

TABLE 1

HEATING TEMPERATURE VARIED
(POLYMERIZATION TEMPERATURE - 65° C.)
(POLYMERIZATION TIME - 1½ HRS.)

| Ex. No. | TEAL:EA[1] | Al:Ti[2] | Temp.[3] | Time[4] | Act.[5] | II (%)[6] | Comments |
|---|---|---|---|---|---|---|---|
| 1 | 8:3 | 156 | 40 | 30 | 176 | 75.3 | |
| 2 | 8:3 | 206 | 45 | 30 | 490 | 90.6 | |
| 3 | 8:3 | 384 | 50 | 30 | 421 | 95.6 | |
| 4 | 8:3 | 217 | 55 | 30 | 719 | 94.7 | Avg. of 5 Runs |
| 5 | 8:3 | 210 | 60 | 30 | 406 | 93.7 | |

[1]Actual TEAL:Ethyl Anisate Millimoles Mole Ratio
[2]Al:Ti Mole Ratio
[3]Heating Temperature (°C.)
[4]Heating Time (Min.)
[5]Activity (g. polymer/g. catalyst) as previously defined
[6]Isotactic Index (%) as previously defined

TABLE 2

HEATING TEMPERATURE VARIED
(POLYMERIZATION TEMPERATURE - 65° C.)
(POLYMERIZATION TIME - 1½ HRS.)

| Ex. No. | TEAL:EA[1] | Al:Ti[2] | Temp.[3] | Time[4] | Act.[5] | II (%)[6] | Comments |
|---|---|---|---|---|---|---|---|
| 6 | 12:3 | 421 | 50 | 30 | 2030 | 85.7 | |
| 7 | 12:3 | 217 | 55 | 30 | 2054 | 88.6 | Avg. of 2 Runs |
| 8 | 12:3 | 388 | 60 | 30 | 1565 | 88.5 | |
| 9 | 12:3 | 424 | 65 | 30 | 1418 | 87.7 | |

[1]Actual TEAL:Ethyl Anisate Millimoles Mole Ratio
[2]Al:Ti Mole Ratio
[3]Heating Temperature (°C.)
[4]Heating Time (Min.)
[5]Activity (g. polymer/g. catalyst) as previously defined
[6]Isotactic Index (%) as previously defined

TABLE 3

HEATING TIME VARIED
(POLYMERIZATION TEMPERATURE - 65° C.)
(POLYMERIZATION TIME - 1½ HRS.)

| Ex. No. | TEAL:EA[1] | Al:Ti[2] | Temp.[3] | Time[4] | Act.[5] | II (%)[6] | Comments |
|---|---|---|---|---|---|---|---|
| 10 | 8:3 | 271 | 55 | 5 | 1264 | 90.7 | Avg. of 2 Runs |
| 11 | 8:3 | 269 | 55 | 10 | 961 | 89.4 | |
| 12 | 8:3 | 240 | 55 | 15 | 1022 | 93.5 | Avg. of 2 Runs |
| 13 | 8:3 | 217 | 55 | 30 | 719 | 94.7 | Avg. of 5 Runs |

[1]Actual TEAL:Ethyl Anisate Millimoles Mole Ratio
[2]Al:Ti Mole Ratio
[3]Heating Temperature (°C.)
[4]Heating Time (Min.)
[5]Activity (g. polymer/g. catalyst) as previously defined
[6]Isotactic Index (%) as previously defined

TABLE 4

HEATING TIME VARIED
(POLYMERIZATION TEMPERATURE - 65° C.)
(POLYMERIZATION TIME - 1½ HRS.)

| Ex. No. | TEAL:EA[1] | Al:Ti[2] | Temp.[3] | Time[4] | Act.[5] | II (%)[6] | Comments |
|---|---|---|---|---|---|---|---|
| 14 | 12:3 | 457 | 55 | 5 | 1957 | 87.7 | |
| 15 | 12:3 | 331 | 55 | 10 | 1795 | 88.5 | |
| 16 | 12:3 | 345 | 55 | 15 | 2093 | 87.6 | |
| 17 | 12:3 | 325 | 55 | 30 | 2054 | 88.6 | Avg. of 2 Runs |
| 18 | 12:3 | 436 | 55 | 45 | 1648 | 91.3 | |

[1]Actual TEAL:Ethyl Anisate Millimoles Mole Ratio
[2]Al:Ti Mole Ratio
[3]Heating Temperature (°C.)
[4]Heating Time (Min.)
[5]Activity (g. polymer/g. catalyst) as previously defined
[6]Isotactic Index (%) as previously defined

TABLE 5

TEAL:ETHYL ANISATE RATIO VARIED
(POLYMERIZATION TEMPERATURE - 65° C.)
(POLYMERIZATION TIME - 1½ HRS.)

| Ex. No. | TEAL:EA[1] | Al:Ti[2] | Temp.[3] | Time[4] | Act.[5] | II (%)[6] | Comments |
|---|---|---|---|---|---|---|---|
| 19 | 4:1 | 87 | 55 | 30 | 287 | 91.7 | |
| 20 | 5:1 | 97 | 55 | 30 | 1595 | 87.4 | |
| 21 | 6:1 | 167 | 55 | 30 | 2246 | 87.5 | |
| 22 | 8:1 | 272 | 55 | 30 | 2941 | 74.1 | |

[1]Actual TEAL:Ethyl Anisate Millimoles Mole Ratio
[2]Al:Ti Mole Ratio
[3]Heating Temperature (°C.)
[4]Heating Time (Min.)
[5]Activity (g. polymer/g. catalyst) as previously defined
[6]Isotactic Index (%) as previously defined

TABLE 6

TEAL:ETHYL ANISATE RATIO VARIED
(POLYMERIZATION TEMPERATURE - 65° C.)
(POLYMERIZATION TIME - 1½ HRS.)

| Ex. No. | TEAL:EA[1] | Al:Ti[2] | Temp.[3] | Time[4] | Act.[5] | II (%)[6] | Comments |
|---|---|---|---|---|---|---|---|
| 23 | 8:3 | 217 | 55 | 30 | 719 | 94.7 | Avg. of 5 Runs |
| 24 | 9:3 | 272 | 55 | 30 | 667 | 97.9 | |
| 25 | 10:3 | 323 | 55 | 30 | 960 | 90.2 | |
| 26 | 11:3 | 370 | 55 | 30 | 1138 | 88.4 | |
| 27 | 12:3 | 325 | 55 | 30 | 2054 | 88.6 | Avg. of 2 Runs |
| 28 | 15:3 | 495 | 55 | 30 | | 84.2 | |

[1]Actual TEAL:Ethyl Anisate Millimoles Mole Ratio
[2]Al:Ti Mole Ratio
[3]Heating Temperature (°C.)
[4]Heating Time (Min.)
[5]Activity (g. polymer/g. catalyst) as previously defined
[6]Isotactic Index (%) as previously defined

TABLE 7[1]

HEATING TIME VARIED
(POLYMERIZATION TEMPERATURE - 65° C.)
(POLYMERIZATION TIME - 1½ HRS.)

| Ex. No. | TEAL:EA[2] | Al:Ti[3] | Temp.[4] | Time[5] | Act.[6] | II (%)[7] | Comments |
|---|---|---|---|---|---|---|---|
| 29 | 13.5:3 | | 55 | 5 | 3818 | 84.6 | |
| 30 | 13.5:3 | | 55 | 30 | 3610 | 86.4 | |

[1]Titanium halide containing component the same as that of General Procedure, except MgCl₂ was produced by hot drying commercially available anhydrous MgCl₂ in a vacuum oven and then treating with anhydrous HCl for 1 hour at 350° C. The MgCl₂ is then milled for 5 days. (Surface area 40 M²/g.; H₂O - .09%).
[2]Actual TEAL:Ethyl Anisate Millimoles Mole Ratio
[3]Al:Ti Mole Ratio
[4]Heating Temperature (°C.)
[5]Heating Time (Min.)
[6]Activity (g. polymer/g. catalyst) as previously defined
[7]Isotactic Index (%) as previously defined

I claim:

1. A catalyst system produced by a process comprising heating at an effective temperature for an effective length of time:
(i) an organoaluminum-containing component comprising an organoaluminum compound selected from the group consisting of ·
    (a) alkylhaloaluminum compounds having the formula $AlR_nX_{3-n'}$ wherein R represents $C_{1-14}$ saturated hydrocarbon residues, X represents Cl and Br, and n is 2 or 1.5;
    (b) alkyl aluminum compounds having the formula $AlR_n(OR')_{3-n}$ wherein R and n are as defined above and R' represents $C_{1-14}$ saturated hydrocarbon residues; and
    (c) trialkyl aluminums having the formula $AlRR'R''$, where R, R' and R'' are the same or different and respectively represent a $C_{1-14}$ saturated hydrocarbon residue; and an electron donor compound selected from the group consisting of amines, amides, ethers, esters, ketones, nitriles, phosphines, stibines, arsines, phosphoramides, thioethers, aldehydes, alcoholates, and organic acid salts of metals belonging to the first four groups of the Periodic Table; and
(ii) a titanium halide-containing component obtained by contacting a titanium halide compound or complex of the titanium halide compound and an electron donor compound with a support which comprises as the essential support material thereof an anhydrous dihalide of magnesium or manganese,
the combination of effective temperature and effective time being sufficient to produce a catalyst system having enhanced stereospecificity.

2. The system of claim 1, wherein the effective temperature is from about 40° C. to about 80° C. and the effective length of time is from about 5 minutes to about 90 minutes.

3. The system of claim 1, wherein the effective temperature is from about 40° C. to about 65° C. and the effective length of time is from about 15 minutes to about 45 minutes.

4. The system of claim 1, wherein the titanium halide containing component is obtained by contacting a complex of $TiCl_4$ and ethyl benzoate with a support which comprises as the essential support material thereof $MgCl_2$.

5. The system of claim 1, wherein the organoaluminum compound is selected from the group consisting of: trimethyl aluminum, triethyl aluminum, n-tripropyl aluminum, n-tributyl aluminum, triisobutyl aluminum, trioctyl aluminum, tridodecyl aluminum, methyl aluminum sesquichloride, ethyl aluminum sesquichloride, diethyl aluminum chloride, ethyl aluminum dichloride, dibutyl aluminum chloride, diethyl aluminum sesquibromide, and mixtures thereof.

6. The system of claim 1, wherein the organoaluminum containing component comprises the organoaluminum compound and an ester of an aromatic acid.

7. The system of claim 1, wherein the organoaluminum containing component comprises the organoaluminum compound and an electron donor selected from the group consisting of: esters of aliphatic, cycloaliphatic and aromatic mono- and polycarboxylic acids, esters of alkoxy or amino acids, and esters of carbonic, phosphorous, sulfuric, phosphoric and silicic acids.

8. The system of claim 1, wherein the organoaluminum containing component comprises triethylaluminum and ethyl anisate or ethyl benzoate.

9. The system of claim 1, wherein the molar ratio of organoaluminum compound to electron donor in the organoaluminum containing component is less than about 10:1.

10. The system of claim 9, wherein the molar ratio is 10:1 to 2:1.

11. The system of claim 9, wherein the molar ratio is 6:1 to 2:1.

12. The system of claim 1, wherein the organoaluminum-containing component comprises the organoluminum compound and an electron donor selected from the group consisting of carboxylic esters and diamines.

13. The system of claim 1, wherein the organoaluminum-containing component comprises the organoaluminum compound and an electron donor selected from the group consisting of: ethyl benzoate, methyl benzoate, methyl and ethyl methoxybenzoate, ethyl butylbenzoate, ethyl p- and o-chlorobenzoate, ethyl butoxybenzoate, ethyl toluate, ethyl acetate, ethyl propionate, ethyl alpha-naphthyl ether, ethyl cyclohexyl ether, ethyl pivalate, ethyl N,N-diethylcarbamate, diethyl carbonate, diethyl sulfate, dimethyl maleate, ethyl benzenesulfonate, triethyl borate, ethyl beta-naphthyl ether, ethyl toluate, N,N,N',N'-tetramethylenediamine, 1,2,4-trimethylpiperazine, and 2,5-dimethylpiperazine.

14. A process for producing a catalyst system comprising treating at an effective temperature for an effective length of time:

(i) an organoaluminum-containing component comprising an organoaluminum compound selected from the group consisting of
  (a) alkylhaloaluminum compounds having the formula $AlR_nX_{3-n}$, wherein R represents $C_1$–$C_{14}$ saturated hydrocarbon residue, X represents Cl and Br, and n is 2 or 1.5;
  (b) alkyl aluminum compounds having the formula $AlR_n(OR')_{3-n}$ wherein R and n are as defined above and R' represents $C_{1-14}$ saturated hydrocarbon residue; and
  (c) trialkyl aluminums having the formula AlRR'R", where R, R' and R" are the same or different and respectively represent a $C_{1-14}$ saturated hydrocarbon residue;
  and an electron donor compound selected from the group consisting of amines, amides, ethers, esters, ketones, nitriles, phosphines, stilbines, arsines, phosphoramides, thioethers, aldehydes, alcoholates, and organic acid salts of metals belonging to the first four groups of the Periodic Table; and
(ii) a titanium halide-containing component obtained by contacting a titanium halide compound or complex of the titanium halide compound and an electron donor compound with a support which comprises as the essential support material thereof an anhydrous dihalide of magnesium or manganese;
the combination of effective temperature and effective time being sufficient to produce a catalyst system having enhanced stereospecificity.

15. The process of claim 14, wherein the effective temperature is from about 40° C. to about 80° C. and the effective length of time is from about 5 minutes to about 90 minutes.

16. The process of claim 14, wherein the effective temperature is from about 40° C. to about 65° C. and the effective length of time is from about 15 minutes to about 45 minutes.

17. The process of claim 14, wherein the titanium halide containing component is obtained by contacting a complex of $TiCl_4$ and ethyl benzoate with a support which comprises as the essential support material thereof $MgCl_2$.

18. The process of claim 14, wherein the organoaluminum compound is selected from the group consisting of: trimethyl aluminum, triethyl aluminum, n-tripropyl aluminum, n-tributyl aluminum, triisobutyl aluminum, trioctyl aluminum, tridodecyl aluminum, methyl aluminum sesquichloride, ethyl aluminum sesquichloride, diethyl aluminum chloride, ethyl aluminum dichloride, dibutyl aluminum chloride, diethyl aluminum sesquibromide, and mixtures thereof.

19. The process of claim 14, wherein the organoaluminum containing component comprises the organoaluminum compound and an ester of an aromatic acid.

20. The process of claim 14, wherein the organoaluminum containing component comprises the organoaluminum compound and an electron donor selected from the group consisting of: esters of aliphatic, cycloaliphatic and aromatic mono- and polycarboxylic acids, esters of alkoxy or amino acids, and esters of carbonic, phosphorous, sulfuric, phosphoric and silicic acids.

21. The process of claim 14, wherein the organoaluminum containing component comprises triethylaluminum and ethyl anisate or ethyl benzoate.

22. The process of claim 14, wherein the molar ratio of organoaluminum compound to electron donor in the organoaluminum containing component is less than about 10:1.

23. The process of claim 22, wherein the molar ratio is 10:1 to 2:1.

24. The process of claim 22, wherein the molar ratio is 6:1 to 2:1.

25. The process of claim 14, wherein the organoaluminum-containing component comprises the organoaluminum compound and an electron donor selected from the group consisting of carboxylic esters and diamines.

26. The process of claim 14, wherein the organoaluminum-containing component the organoaluminum compound and an electron donor selected from the group consisting of: ethyl benzoate, methyl benzoate, methyl and ethyl methoxybenzoate, ethyl butylbenzoate, ethyl p- and o-chlorobenzoate, ethyl butoxybenzoate, ethyl toluate, ethyl acetate, ethyl propionate, ethyl alpha-naphthyl ether, ethyl cyclohexyl ether, ethyl pivalate, ethyl N,N-diethylcarbamate, diethyl carbonate, diethyl sulfate, dimethyl maleate, ethyl benzenesulfonate, triethyl borate, ethyl beta-naphthyl ether, ethyl toluate, N,N,N',N'-tetramethylenediamine, 1,2,4-trimethylpiperazine, and 2,5-dimethylpiperazine.

27. A method of enhancing the stereospecificity of a catalyst system for the polymerization of alphaolefins, the system comprising:
(i) an organoaluminum-containing component comprising an organoaluminum compound selected from the group consisting of
  (a) alkylhaloaluminum compounds having the formula $AlR_nX_{3-n}$, wherein R represents $C_{1-14}$ saturated hydrocarbon residue, X represents Cl and Br, and n is 2 or 1.5;
  (b) alkyl aluminum compounds having the formula $AlR_n(OR')_{3-n}$ wherein R and n are as defined above and R' represents $C_{1-14}$ saturated hydrocarbon residue; and
  (c) trialkyl aluminums having the formula AlRR'R", where R, R' and R" are the same or different and respectively represent a $C_{1-14}$ saturated hydrocarbon residue;
  and an electron donor compound selected from the group consisting of amines, amides, ethers, esters, ketones, nitriles, phosphines, stilbines, arsines, phosphoramides, thioethers, aldehydes, alcoholates, and organic acid salts of metals belonging to the first four groups of the Periodic Table; and
(ii) a titanium halide-containing component obtained by contacting a titanium halide compound, or complex of the titanium halide compound and an electron donor compound with a support which comprises as the essential support material thereof an anhydrous bihalide of magnesium or manganese;
the method comprising, prior to contacting the catalyst system with the alpha-olefin, heating components (i) and (ii) at an effective temperature for an effective length of time, and the combination of effective temperature and effective time being sufficient to produce a catalyst system having enhanced stereospecificity.

28. The method of claim 27, wherein the effective temperature is from about 40° C. to about 80° C. and the effective length of time is from about 5 minutes to about 90 minutes.

29. The method of claim 27, wherein the effective temperature is from about 40° C. to about 65° C. and the effective length of time is from about 15 minutes to about 45 minutes.

30. The method of claim 27, wherein the titanium halide containing component is obtained by contacting a complex of $TiCl_4$ and ethyl benzoate with a support which comprises as the essential support material thereof $MgCl_2$.

31. The method of claim 27, wherein the organoaluminum compound is selected from the group consisting of: trimethyl aluminum, triethyl aluminum, n-tripropyl aluminum, n-tri-butyl aluminum, triisobutyl aluminum, trioctyl aluminum, tridodecyl aluminum, methyl aluminum sesquichloride, ethyl aluminum sesquichloride, diethyl aluminum chloride, ethyl aluminum dichloride, dibutyl aluminum chloride, diethyl aluminum sesquibromide, and mixtures thereof.

32. The method of claim 27, wherein the organoaluminum containing component comprises the organoaluminum compound and an ester of an aromatic acid.

33. The method of claim 27, wherein the organoaluminum containing component comprises the organoaluminum compound and an electron donor selected from the group consisting of: esters of aliphatic, cycloaliphatic and aromatic mono- and polycarboxylic acids; esters of alkoxy or amino acids; and esters of carbonic, phosphorous, sulfuric, phosphoric and silicic acids.

34. The method of claim 27, wherein the organoaluminum containing component comprises triethylaluminum and ethyl anisate or ethyl benzoate.

35. The method of claim 27, wherein the molar ratio of organoaluminum compound to electron donor in the organoaluminum containing component is less than about 10:1.

36. The method of claim 35, wherein the molar ratio is 10:1 to 2:1.

37. The method of claim 35, wherein the molar ratio is 6:1 to 2:1.

38. The method of claim 27, wherein the organoaluminum-containing component comprises the organoaluminum compound and an electron donor selected from the group consisting of carboxylic esters and diamines.

39. The method of claim 27, wherein the organoaluminum-containing component comprises the organoaluminum compound and an electron donor selected from the group consisting of: ethyl benzoate, methyl benzoate, methyl and ethyl methoxybenzoate, ethyl butylbenzoate, ethyl p- and o-chlorobenzoate, ethyl butoxybenzoate, ethyl toluate, ethyl acetate, ethyl propionate, ethyl alpha-naphthyl ether, ethyl cyclohexyl ether, ethyl pivalate, ethyl N,N-diethylcarbamate, diethyl carbonate, diethyl sulfate, dimethyl maleate, ethyl benzenesulfonate, triethyl borate, ethyl beta-naphthyl ether, ethyl toluate, N,N,N',N-tetramethylenediamine, 1,2,4-triethylpiperazine, and 2,5-dimethylpiperazine.

* * * * *

UNITED STATES PATENT AND TRADEMARK OFFICE
CERTIFICATE OF CORRECTION

PATENT NO. : 4,487,845

DATED : December 11, 1984

INVENTOR(S) : Kelly B. Triplett

It is certified that error appears in the above—identified patent and that said Letters Patent is hereby corrected as shown below:

Col. 3, line 3, delete "propylene" and insert therefor -- polypropylene --.
Col. 4, line 4, delete "stereospecificty" and insert therefor -- stereospecificity --.
Col. 4, line 9, delete "range" and insert therefor -- ranges --.
Col. 7, line 52, delete "properties" and insert therefor -- proportions --.
Example 28, Col. 11 - Table 6, under "Act.$^5$", delete "84.2" and insert -- 2515 -- and insert under the "II (%)$^6$ Example 28" -- 84.2 --.
Col. 13, lines 6 and 11, delete "residue" and insert -- residues --.
Col. 13, line 18, delete "stilbines" and insert -- stibines --.
Col. 14, line 13, after "component" insert -- comprises --.
Col. 14, lines 33 and 38, delete "residue" and insert -- residues --.
Col. 14, line 46, delete "stilbines" and insert -- stibines --.

Signed and Sealed this

Eighth Day of October 1985

[SEAL]

Attest:

Attesting Officer

DONALD J. QUIGG

Commissioner of Patents and Trademarks—Designate